(12) United States Patent
Tsengas

(10) Patent No.: US 7,878,151 B2
(45) Date of Patent: Feb. 1, 2011

(54) FETCH AND RETRIEVE TOSSING TOY

(75) Inventor: Steven Tsengas, Fairport Harbor, OH (US)

(73) Assignee: OurPet's Company, Fairport Harbor, OH (US)

( * ) Notice: Subject to any disclaimer, the term of this patent is extended or adjusted under 35 U.S.C. 154(b) by 522 days.

(21) Appl. No.: 11/945,716

(22) Filed: Nov. 27, 2007

(65) Prior Publication Data

US 2010/0326368 A1 Dec. 30, 2010

(51) Int. Cl.
*A01K 15/02* (2006.01)

(52) U.S. Cl. .................................................. 119/707

(58) Field of Classification Search ............... 119/707, 119/702, 709, 710, 711; D30/160; 446/34, 446/236, 255; 43/3
See application file for complete search history.

(56) References Cited

U.S. PATENT DOCUMENTS

| | | | | |
|---|---|---|---|---|
| 2,131,229 | A * | 9/1938 | McMennamin | 446/419 |
| 3,830,202 | A * | 8/1974 | Garrison | 119/709 |
| 4,907,537 | A * | 3/1990 | Shirk | 119/707 |
| 5,191,856 | A * | 3/1993 | Gordon | 119/711 |
| 5,706,762 | A * | 1/1998 | Dokken | 119/712 |
| 5,782,207 | A * | 7/1998 | Goodham | 119/707 |
| 5,865,146 | A * | 2/1999 | Markham | 119/707 |
| 6,415,740 | B1 | 7/2002 | Curry | |
| 6,490,998 | B1 * | 12/2002 | Rocher | 119/707 |
| 6,574,904 | B1 * | 6/2003 | Fencel et al. | 43/3 |
| 6,615,766 | B1 | 9/2003 | Curry | |
| 6,681,721 | B1 * | 1/2004 | Buschy | 119/709 |
| D513,816 | S * | 1/2006 | Crane et al. | D30/160 |
| D517,752 | S * | 3/2006 | Byrne | D30/160 |
| 7,201,117 | B2 | 4/2007 | Ritchey et al. | |
| D542,506 | S | 5/2007 | Springer | |
| D546,507 | S * | 7/2007 | Byrne | D30/160 |
| D571,061 | S * | 6/2008 | Nazimek | D30/160 |
| 7,543,550 | B2 * | 6/2009 | Simpson | 119/708 |
| 2006/0162672 | A1 * | 7/2006 | Dokken | 119/707 |
| 2006/0260560 | A1 * | 11/2006 | Renforth et al. | 119/707 |
| 2007/0234969 | A1 * | 10/2007 | Lynch | 119/707 |
| 2009/0000565 | A1 * | 1/2009 | Bryce | 119/707 |
| 2009/0071412 | A1 * | 3/2009 | Ritchey | 119/709 |
| 2009/0101078 | A1 * | 4/2009 | Dobihal | 119/707 |

OTHER PUBLICATIONS

Cindy Deangelis Duffy, Product Catalog Sheet, Jan. 2006, p. 1, vol. 6, Swag Company Inc., San Diego.
http://web.archive.org/web/20060811001205/loopiestoys.com/home.html.
Dated Invoice, May 15, 2006, 1 page.

* cited by examiner

*Primary Examiner*—Yvonne R. Abbott
(74) *Attorney, Agent, or Firm*—John D. Gugliotta, PE, Esq

(57) ABSTRACT

A pet toy is provided having a tubular, linearly elongated main body terminated at each end by a replaceable wing assembly. As the toy is flying through the air, the wings provides a visual 'flapping' like stimuli, similar to that of the wings of a bird. The instant abstract is neither intended to define the invention disclosed in this specification nor intended to limit the scope of the invention in any way.

10 Claims, 2 Drawing Sheets

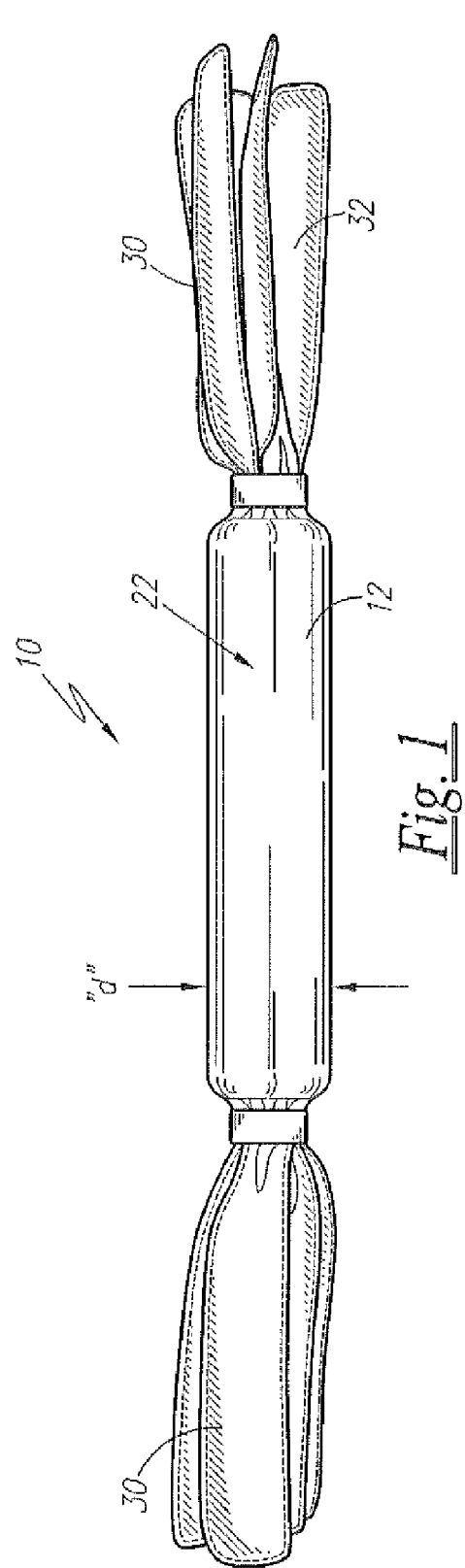
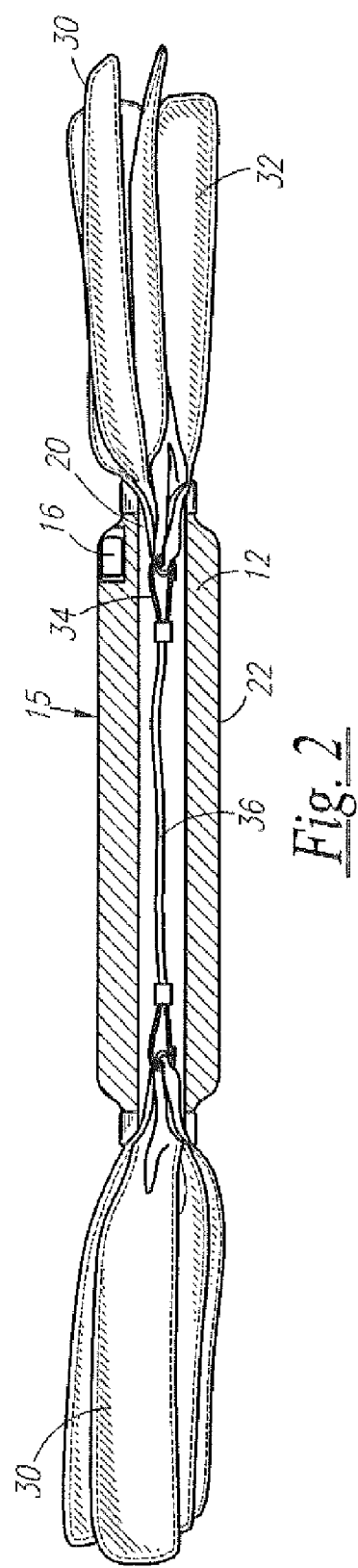

FETCH AND RETRIEVE TOSSING TOY

BACKGROUND OF THE INVENTION

1. Field of the Invention

The present invention is directed generally to pet toys, and particularly to a pet toy designed to appeal to an animal's instinctive behaviors and facilitate activities based on such instincts.

2. Description of the Related Art

Dogs enjoy retrieving various types of objects such as sticks, balls, flying discs, and the like. Many breeds have an enhanced enjoyment in "playing fetch" in that such activities have been bred into such lines. Retrievers, bird dogs or gun dogs have been bred to retrieve game foul, spaniels to flush birds from the brush, and other such similar activities. Typically, such breads can be entertained by retrieving a flying disc is made from a plastic material. The disc has an outer side with a generally smooth surface and an underside that has a rim extending along the periphery of the disc. The rim is raised from the rest of the disc so that the dog may easily grip the rim between its jaws.

A problem may occur, however, when the dog seeks to retrieve the disc in that the disc may not always be easily gripped by the dog. That is, if the disc lands with the underside facing upwardly, the rim is exposed which the dog may grip with its teeth. If the disc lands with the underside facing downwardly, the dog may have some difficulty in grasping the smooth side of the disc with its teeth. Therefore, the dog may not be able to retrieve the disc, thereby decreasing the enjoyment of the game by both the person throwing the disc as well as the dog.

Another problem may occur in that even though such breeds have the instinct to retrieve, a plastic disc shaped object just simply will not stimulate this instinct. It has been found that interactive toys are more successfully interactive if they have been designed with a fundamental understanding of the animal's biological behavior, instincts, unique senses and physical capabilities and needs. In order to accomplish this, the interactive toy must stimulate and reward positive mental and physical activity through real sounds, sights, tactile feel, aroma, movement, and the like.

Therefore, a need exists for a durable dog fetch and retrieve toy that is capable of providing the stimulus that triggers the animal's instinctive retrieving behaviors.

SUMMARY OF THE INVENTION

It is an object of the present invention to provide a fetch and retrieve pet toy designed to appeal to an animal's instinctive behaviors and facilitate activities based on such instincts.

It is a feature of the present invention to provide a elongated fetch toy having flappable appendages connected to either side.

Briefly described according to the preferred embodiment of the present invention, a fetch and retrieve pet toy is provided having a linearly elongated cylindrical hollow body formed of rotational molded plastic, or alternately formed of closed cell foam. The cylinder has an outer body surface, and forms an internal tubular conduit along the elongated centerline. At either opposed end are connected a replaceable appendage having in a plurality of individual fingered flexible cloth protuberances. Each of these 'flappable' appendages are connected together by an elastic cord traversing the internal tubular conduit.

According to the preferred embodiment, the present invention provides a pet toy capable of easily being tossed by the owner, easily caught or captured by the pet, and provides a visual stimuli similar to that of an injured or downed winged prey. Such stimulation triggers the naturally bred fetching instincts of some dog breeds.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1. is a perspective view of fetch and retrieve tossing toy according to the preferred embodiment of the present invention;

FIG. 2. is a cross sectional view taken along the linear centerline thereof;

DESCRIPTION OF THE PREFERRED EMBODIMENTS

Figure 3:
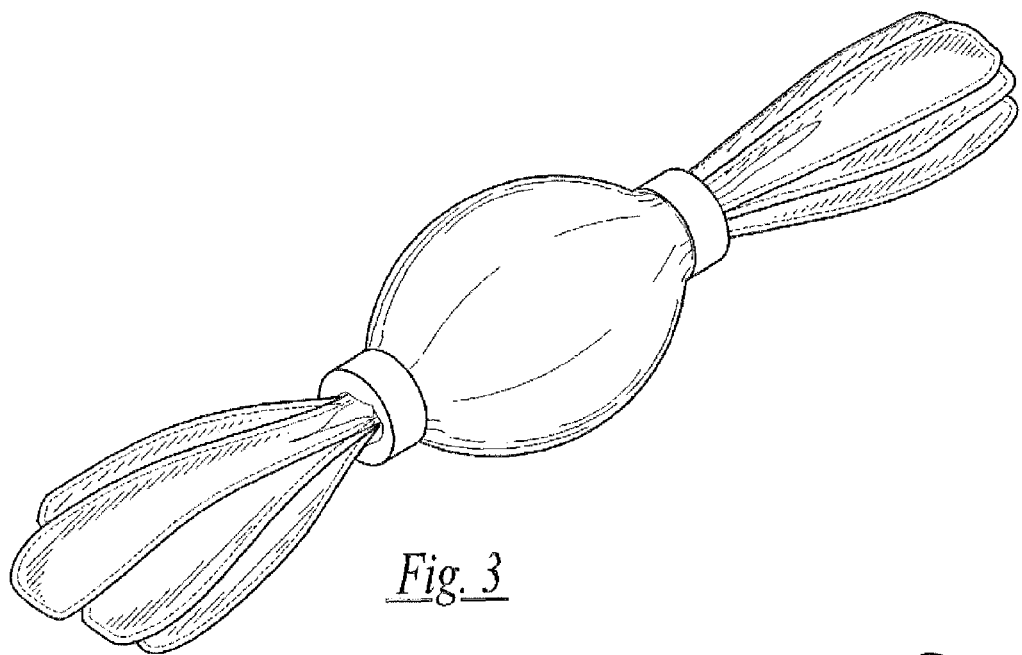
FIG. 3 is a perspective view of a fetch and retrieve tossing toy having an oval main body according to a first alternate embodiment.
Figure 4:
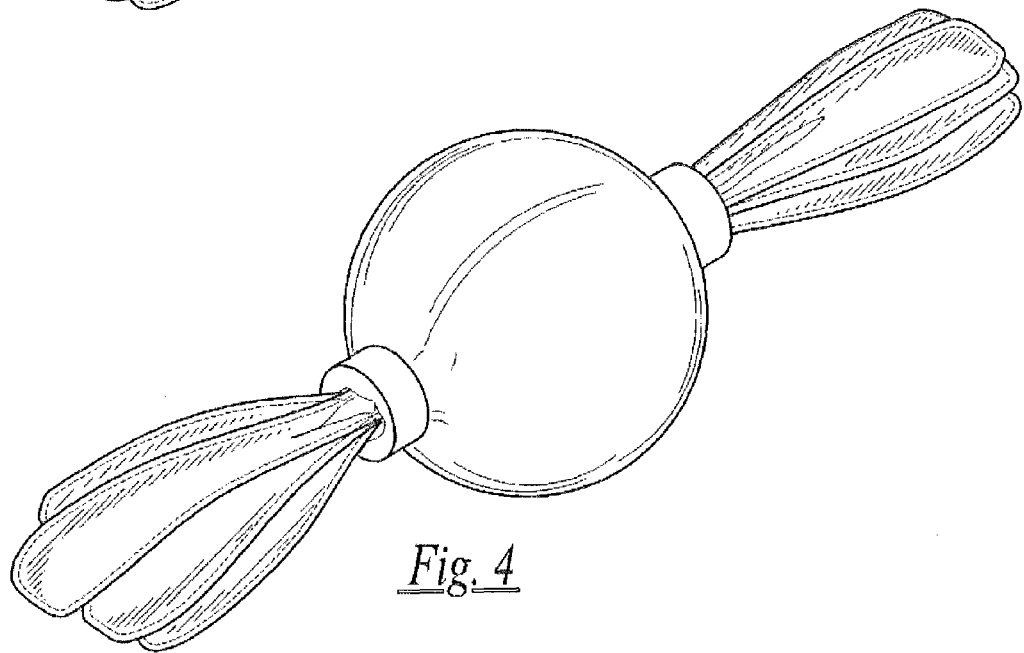
FIG. 4 is a perspective view of a fetch and retrieve tossing toy having a ball-shaped main body according to a second alternate embodiment.

The best mode for carrying out the invention is presented in terms of its preferred embodiment, herein depicted within the Figures.

1. Detailed Description of the Figures

Briefly described according to the preferred embodiment of the present invention, a fetch and retrieve pet toy, generally noted as 10, is provided having a linearly elongated, rotationally molded body 12. Such as construction forms a durable biting surface, while at the same time being capable of flotation if placed in water. The body 12 forms a cylindrical formed and having an outer diameter "d" sufficiently small to allow for grasping and carrying in a dog's mouth. In the commercial embodiment, small, medium and large diameters of 1.25 inches, 1.63 inches, and 2 inches, respectively, are provided. However, such dimensions are merely exemplary and are in no way intended to be limiting. Similarly, the body 12 of the commercial embodiment have varying lengths of small, medium and large being of 4 inches, 8 inches, and 9 inches, respectively.

The use of rotational molded plastic for the body 12 forms a hollow double wall that can provide flexibility and give, and can accommodate the incorporation of a noise maker, or 'squeaker' 16, in an otherwise conventional manner. Being hollow, sufficient buoyancy is achieved to act as a flotation device in water. Alternately, the body 12 could be formed of closed cell foam to provide similar performance and cost, but without the capacity to incorporate a squeaker. The body 12 has an outer cylindrical surface 18, and forms an internal tubular conduit 20 along the elongated centerline. The outer surface 18 is covered by a durable outer cover 22, such as a cloth, canvass or ballistic nylon. Such a covering provides a texture, look and feel closer to that of a natural bird prey that cannot be matched by plastic alone, thereby providing further stimulation or reinforcement of natural instincts from successive handling of the toy 10.

At either opposed end are connected a replaceable wing appendages 30. Each wing 30 of the commercial embodiment is anticipated has having varying lengths of small, medium and large being of 3.5 inches, 6 inches, and 8 inches, respectively. Each wing 30 is constructed using two halves of different colors on each side, respectively, further emulating the color contrast typically found naturally on the wings of many birds. Each wing 30 has a plurality of individual fingered flexible cloth protuberances 32. Each of these wings 30 are freely flexible and moveable, creating a 'flapping' motion when thrown. Each wing 30 is connected to a fastener 34. The fastener 34 terminates either end of an elongated elastic member 36, shown herein as a nylon strap or bungee. The wings 30 are such connected together by the elastic cord 36 which traverses the internal tubular conduit 20.

2. Operation of the Preferred Embodiment

In operation, the present invention is utilized like a convention fetch and retrieve toy, being tossed for purpose of being chased, caught and returned by the user's pet. The elongated, tubular nature of the body 12 provides a pet toy capable of easily being tossed by the owner and easily caught or captured by the pet. As the toy 10 is flying through the air, he wings 30 provides a visual 'flapping' like stimuli, similar to that of the wings of a bird. The bicolor construction further reinforces this stimulation which triggers the naturally bred fetching instincts of some dog breeds. Should the wings 30 become worn or damaged, the user can remove the wing 30 at the fastener 34 and replaced with a suitable replacement component of similar or like construction.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A fetch and retrieve pet toy comprising:
   a linearly elongated, tubular hollow body having a generally cylindrical outer surface and forming an internal tubular conduit along an elongated centerline;
   a durable outer cover covering said outer surface;
   a first flexible wing;
   a second flexible wing; and
   said first flexible wing connected to said second flexible wing at either opposed end of said tubular hollow body;
   wherein each wing has a plurality of individual fingered flexible cloth protuberances that are freely flexible and moveable, creating a 'flapping' motion when thrown.

2. The pet toy of claim 1, wherein body forms a cylinder having an outer diameter sufficiently small to allow for grasping and carrying in a dog's mouth.

3. The pet toy of claim 2, wherein said outer diameter is between 1.25 inches and 3 inches.

4. The pet toy of claim 2, wherein said body has a length of between approximately 4 inches and approximately 11 inches.

5. The pet toy of claim 1, wherein said body is formed of rotational molded plastic and forms a hollow double wall.

6. The pet toy of claim 1, further comprising a noise maker, or squeaker incorporated into said body.

7. The pet toy of claim 1, wherein said outer covering is selected from the group comprising: cloth; team backed cloth; canvass; and ballistic nylon.

8. The pet toy of claim 1, wherein said covering provides a texture, look and feel closer to that of a natural bird prey that cannot be matched by plastic alone, thereby providing further stimulation or reinforcement of natural instincts from successive handling of the toy.

9. The pet toy of claim 1, wherein each said wing is constructed using two halves.

10. The pct toy of claim 9, wherein each said wing half is formed of a different color on each side, respectively.

* * * * *